United States Patent
Kubo et al.

(10) Patent No.: US 11,180,051 B2
(45) Date of Patent: Nov. 23, 2021

(54) DISPLAY APPARATUS AND VEHICLE INCLUDING THE SAME

(71) Applicant: TOYOTA JIDOSHA KABUSHIKI KAISHA, Toyota (JP)

(72) Inventors: Kazuki Kubo, Toyota (JP); Junta Izumi, Nagoya (JP); Yoshihiro Uchida, Nagakute (JP); Masaki Uchiyama, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/656,741

(22) Filed: Oct. 18, 2019

(65) Prior Publication Data
US 2020/0122604 A1    Apr. 23, 2020

(30) Foreign Application Priority Data
Oct. 19, 2018    (JP) .............................. JP2018-197635

(51) Int. Cl.
| | |
|---|---|
| *H02J 7/00* | (2006.01) |
| *B60L 58/16* | (2019.01) |
| *B60L 58/25* | (2019.01) |
| *B60L 58/13* | (2019.01) |

(52) U.S. Cl.
CPC .............. *B60L 58/16* (2019.02); *B60L 58/13* (2019.02); *B60L 58/25* (2019.02); *B60L 2250/16* (2013.01)

(58) Field of Classification Search
None
See application file for complete search history.

(56) References Cited

U.S. PATENT DOCUMENTS

| | | | |
|---|---|---|---|
| 2013/0300425 A1* | 11/2013 | Shiraishi | G01R 31/3835 324/426 |
| 2016/0049821 A1* | 2/2016 | Aridome | H02J 7/04 320/128 |
| 2018/0050601 A1 | 2/2018 | Katanoda | |
| 2019/0039474 A1* | 2/2019 | Wada | H02J 7/0021 |

FOREIGN PATENT DOCUMENTS

JP    2018-029430 A    2/2018

* cited by examiner

*Primary Examiner* — Arun C Williams
(74) *Attorney, Agent, or Firm* — Sughrue Mion, PLLC

(57) ABSTRACT

A vehicle includes a controller and a display. The controller is configured to calculate a capacity retention (a degree of deterioration) based on measurement data of a main battery. The controller estimates an upper limit value and a lower limit value of an error (range) of the calculated capacity retention. The controller calculates a capacity retention range including the upper limit value Wu and the lower limit value. The controller has the display show the calculated capacity retention range.

3 Claims, 8 Drawing Sheets

DISPLAY APPARATUS AND VEHICLE INCLUDING THE SAME

This nonprovisional application is based on Japanese Patent Application No. 2018-197635 filed with the Japan Patent Office on Oct. 19, 2018, the entire contents of which are hereby incorporated by reference.

BACKGROUND

Field

The present disclosure relates to a display apparatus and a vehicle including the same, and particularly to a display apparatus configured to show a degree of deterioration of a secondary battery and a vehicle including the same.

Description of the Background Art

A secondary battery as a driving power supply (motive power source) for a motor is mounted on a vehicle such as an electric vehicle. It has been known that a secondary battery deteriorates over time, which leads to increase in internal resistance or lowering in full charge capacity of the secondary battery. Therefore, various techniques for estimating a degree of deterioration of a secondary battery have been proposed. For example, Japanese Patent Laying-Open No. 2018-029430 has disclosed a technique to calculate a degree of deterioration of a secondary battery based on measurement data of the secondary battery.

SUMMARY

A degree of deterioration of a secondary battery is a factor important for a user. For example, in an example in which a secondary battery is mounted on a vehicle, when the secondary battery deteriorates and a full charge capacity thereof lowers, a distance which the vehicle can travel with electric power stored in the secondary battery (what is called an EV driving range) decreases. By showing the calculated degree of deterioration, the user can be notified of the current degree of deterioration.

The calculated degree of deterioration, however, may contain a detection error in various sensors used for measurement of the secondary battery or an error in a calculated model. For example, when a degree of deterioration calculated at certain timing and a degree of deterioration calculated at next timing contain errors opposite to each other with respect to a true value, a shown value of the degree of deterioration may have considerably increased or decreased. In this case, proper representation is not provided and the user may feel strange about the shown degree of deterioration.

The present disclosure was made to solve the problem above, and an object thereof is to provide a display apparatus which shows a degree of deterioration of a secondary battery while giving a user strange feeling as little as possible and a vehicle including the same.

A display apparatus according to the present disclosure shows a degree of deterioration of a secondary battery. The display apparatus includes a controller configured to calculate the degree of deterioration of the secondary battery and a display configured to show the degree of deterioration. The controller is configured to control the display to show a deterioration degree range, with a margin of the calculated degree of deterioration.

According to the configuration, the display of the display apparatus shows a deterioration degree range, with a margin of the calculated degree of deterioration being allowed. The range includes, for example, an error margin of the calculated degree of deterioration. The display shows a degree of deterioration as a deterioration degree range covering a certain extent. A user can thus recognize that the degree of deterioration shown on the display has the certain extent. Therefore, even though the shown degree of deterioration may be varied under the influence by an error, the variation is within user's expectations. Therefore, the user is less likely to feel strange about the variation. Therefore, occasions of strange feeling felt by the user about the degree of deterioration shown on the display can be decreased.

In one embodiment, the controller is configured to calculate an SOC difference at the time when the secondary battery is charged from a prescribed SOC to full charge and calculate an amount of electric power used for charging the secondary battery from the prescribed SOC to full charge. The controller is configured to calculate the degree of deterioration by using the SOC difference and the amount of electric power.

As deterioration of the secondary battery proceeds, influence by an error in a degree of deterioration may become great. For example, when a capacity retention representing a percentage of a full charge capacity at the current time point to a full charge capacity in an initial stage (at the time of manufacturing) of the secondary battery is employed as the degree of deterioration, influence by an error in a capacity retention is greater as the capacity retention is lower. According to the configuration, for example, a degree of deterioration of the secondary battery is calculated by what is called a current integration method. When the full charge capacity lowers due to deterioration of the secondary battery in charging from a prescribed SOC to full charge, time required for charging of the secondary battery accordingly decreases. Then, the number of pieces of data used for calculating the degree of deterioration decreases, and hence accumulated errors also decrease. Therefore, as deterioration of the secondary battery proceeds, the error decreases and influence by the error in the degree of deterioration can be lessened.

A vehicle according to the present disclosure includes any display apparatus above.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
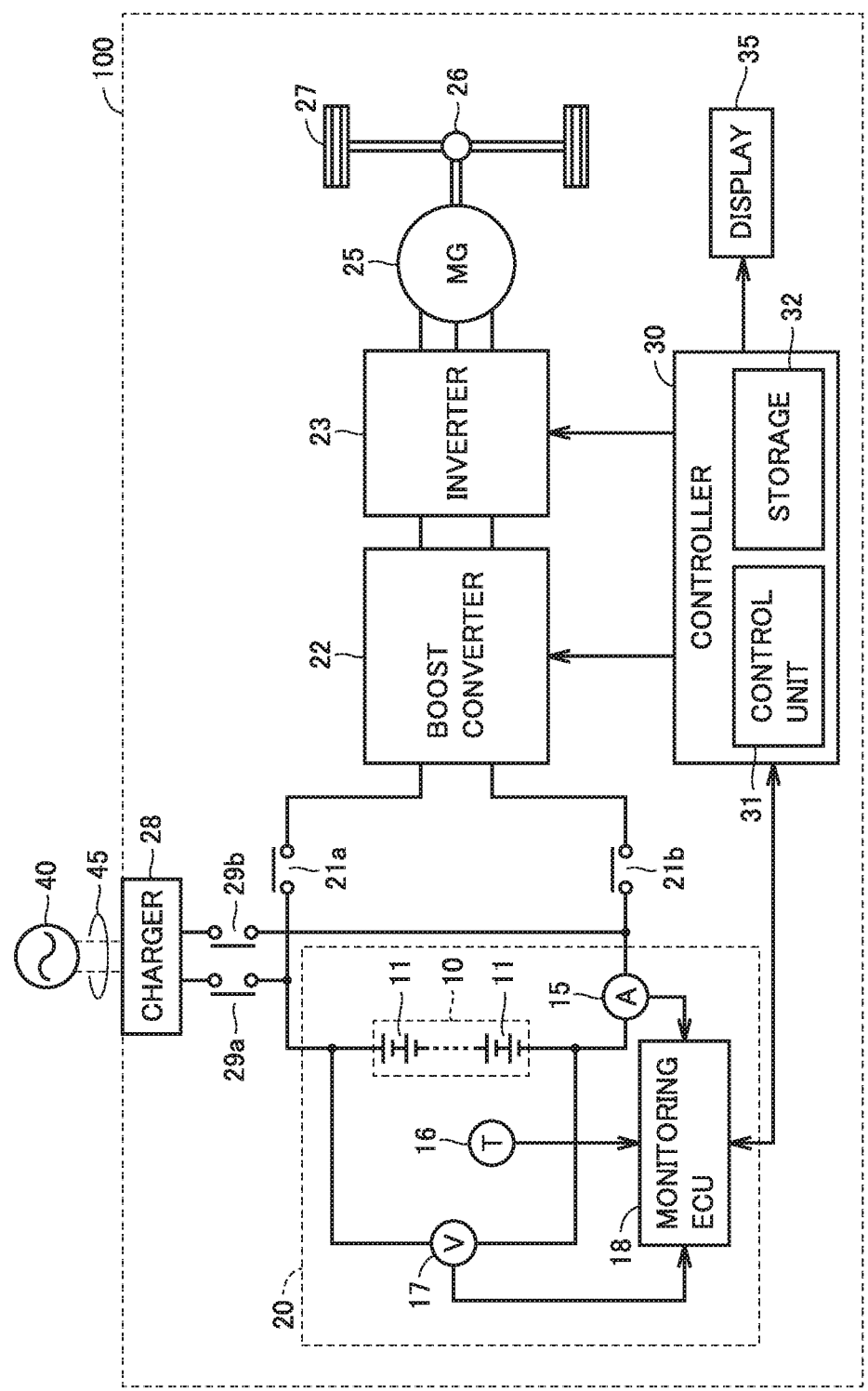
FIG. 1 is a block diagram showing an exemplary configuration of a vehicle to which a display apparatus according to an embodiment is applied.

An embodiment of the present disclosure will be described below in detail with reference to the drawings. The same or corresponding elements in the drawings have the same reference characters allotted and description thereof will not be repeated.

FIG. 1 is a block diagram showing an exemplary configuration of a vehicle to which a display apparatus according to an embodiment of the present disclosure is applied. Though an example in which an electric vehicle is adopted as a vehicle 100 is described in the present embodiment, vehicle 100 is not limited to an electric vehicle but may be, for example, a plug-in hybrid vehicle, a hybrid vehicle, or a fuel cell vehicle.

Referring to FIG. 1, vehicle 100 includes a main battery 10, a boost converter 22, an inverter 23, a motor-generator 25, a transmission gear 26, a drive wheel 27, and a controller 30.

Main battery 10 is mounted on vehicle 100 as a driving power supply (that is, a motive power source) for vehicle 100. Main battery 10 is implemented by a battery assembly (battery pack) 20 including a plurality of battery modules 11. Each battery module 11 includes rechargeable secondary battery cells represented by a lithium ion secondary battery.

In battery pack 20, a current sensor 15, a temperature sensor 16, a voltage sensor 17, and a battery monitoring unit 18 are further arranged. Battery monitoring unit 18 is implemented, for example, by an electronic control unit (ECU). Battery monitoring unit 18 is also referred to as a monitoring ECU 18 below.

Current sensor 15 detects a current input to and output from main battery 10 (which is also referred to as a battery current Ib below). In connection with battery current Ib, a discharging current is expressed as a positive value and a charging current is expressed as a negative value below.

Temperature sensor 16 detects a temperature of main battery 10 (which is also referred to as a battery temperature Tb below). A plurality of temperature sensors 16 may be arranged. In this case, a weighted average value, a maximum value, or a minimum value of temperatures detected by the plurality of temperature sensors 16 may be employed as battery temperature Tb, or a temperature detected by a specific temperature sensor 16 may be employed as battery temperature Tb. Voltage sensor 17 detects a voltage output from main battery 10 (which is also referred to as a battery voltage Vb below).

Monitoring ECU 18 receives detection values from current sensor 15, temperature sensor 16, and voltage sensor 17. Monitoring ECU 18 outputs battery voltage Vb, battery current Ib, and battery temperature Tb to controller 30. Alternatively, monitoring ECU 18 can also have an embedded memory (not shown) store data on battery voltage Vb, battery current Ib, and battery temperature Tb.

Monitoring ECU 18 has a function to calculate a state of charge (SOC) of main battery 10 by using at least one of battery voltage Vb, battery current Ib, and battery temperature Tb. The SOC represents in percentage, a current amount of stored power with respect to a full charge capacity of main battery 10. Controller 30 which will be described later may perform a function to calculate an SOC. Data on main battery 10 such as battery voltage Vb, battery current Ib, battery temperature Tb, and the SOC may also collectively be referred to as measurement data below.

Main battery 10 is connected to boost converter 22 with system main relays 21a and 21b being interposed. Boost converter 22 boosts a voltage output from main battery 10. Boost converter 22 is connected to inverter 23, which converts direct-current (DC) power from boost converter 22 into alternating-current (AC) power.

Motor-generator (three-phase AC motor) 25 generates kinetic energy for running the vehicle by receiving AC power from inverter 23. Kinetic energy generated by motor-generator 25 is transmitted to drive wheel 27. On the other hand, motor-generator 25 converts kinetic energy of the vehicle into electric energy when the vehicle is decelerated or stopped. AC power generated by motor-generator 25 is converted to DC power by inverter 23 and supplied to main battery 10 through boost converter 22. Regenerative power can thus be stored in main battery 10. Motor-generator 25 is thus configured to generate driving power or braking power of the vehicle by transmitting and receiving electric power to and from main battery 10 (that is, charging and discharging of main battery 10).

Boost converter 22 does not have to be provided. When a DC motor is employed as motor-generator 25, inverter 23 does not have to be provided.

When vehicle 100 is configured as a hybrid vehicle which further incorporates an engine (not shown) as a motive power source, output from the engine in addition to output from motor-generator 25 can be used as driving power for running the vehicle. Alternatively, an additional motor-generator (not shown) which generates power based on output from the engine can also be incorporated to generate charging power for main battery 10 based on output from the engine.

Controller 30 is implemented, for example, by an electronic control unit (ECU) and includes a control unit 31 and a storage 32. Storage 32 stores a program for operating control unit 31 and various types of data. Storage 32 may be provided outside controller 30 with reading and writing of data by control unit 31 being allowed.

Controller 30 controls operations of system main relays 21a and 21b, boost converter 22, and inverter 23. When a start switch (not shown) is switched from off to on, controller 30 switches system main relays 21a and 21b from off to on and/or turns on boost converter 22 and inverter 23. When the start switch is switched from on to off, controller 30 switches system main relays 21a and 21b from on to off and/or turns off boost converter 22 and inverter 23.

Controller 30 has a function to calculate a capacity retention Q (which will be described later) of main battery 10. An example of calculation of capacity retention Q by a current integration method as a method of calculating capacity retention Q will be described later in the present embodiment. The function to calculate capacity retention Q can also be performed by monitoring ECU 18.

Vehicle 100 further includes a display 35. Display 35 is configured to show prescribed information to a user of vehicle 100 in response to a control command from controller 30.

The SOC represents in percentage, a current amount of stored power with respect to a current full charge capacity as described above. Therefore, lowering in full charge capacity itself of main battery 10 with progress of deterioration of main battery 10 means decrease in actual amount of stored power (Ah) in spite of an SOC value being the same (for example, SOC=100%). Therefore, in this embodiment, a degree of deterioration of main battery 10 is presented to a user on display 35 together with an SOC of main battery 10, as data showing a state of main battery 10. In the present embodiment, capacity retention Q of main battery 10 is presented to the user on display 35 as a degree of deterioration. Display 35 shows at least an SOC of main battery 10 and capacity retention Q of main battery 10 to the user. Display 35 can be implemented, for example, by a touch panel display including a liquid crystal panel.

Vehicle 100 is further configured to be equipped with an external charging function for charging main battery 10 from an external power supply 40. Vehicle 100 further includes a charger 28 and charge relays 29a and 29b. Charging of main battery 10 from external power supply 40 is also referred to as external charging below.

External power supply 40 is a power supply provided outside the vehicle, and, for example, a commercial AC power supply is applicable as external power supply 40. Charger 28 converts electric power from external power supply 40 into charging power for main battery 10. Charger 28 is connected to main battery 10 with charge relays 29a and 29b being interposed. While charge relays 29a and 29b are on, main battery 10 can be charged with electric power from external power supply 40.

External power supply 40 and charger 28 can be connected to each other, for example, through a charging cable 45. Main battery 10 can be charged from external power supply 40 as external power supply 40 and charger 28 are electrically connected to each other while charging cable 45 is attached. Alternatively, vehicle 100 may be configured such that electric power is wirelessly transmitted between external power supply 40 and charger 28. For example, main battery 10 can be charged from external power supply 40, for example, by transmission of electric power via a power transmission coil (not shown) on a side of the external power supply and a power reception coil (not shown) on a side of the vehicle.

When AC power is thus supplied from external power supply 40, charger 28 is configured to perform a function to convert supplied power (AC power) from external power supply 40 to charging power (DC power) for main battery 10. Alternatively, when external power supply 40 directly supplies charging power for main battery 10, charger 28 may transfer DC power from external power supply 40 to main battery 10. A manner of external charging of vehicle 100 is not particularly limited.

Vehicle 100 runs while main battery 10 is being charged or discharged. Furthermore, main battery 10 is charged by the external charging function while vehicle 100 remains stopped. With such charging and discharging of main battery 10, main battery 10 deteriorates over time.

<Method of Calculating Capacity Retention Q>

Figure 2:
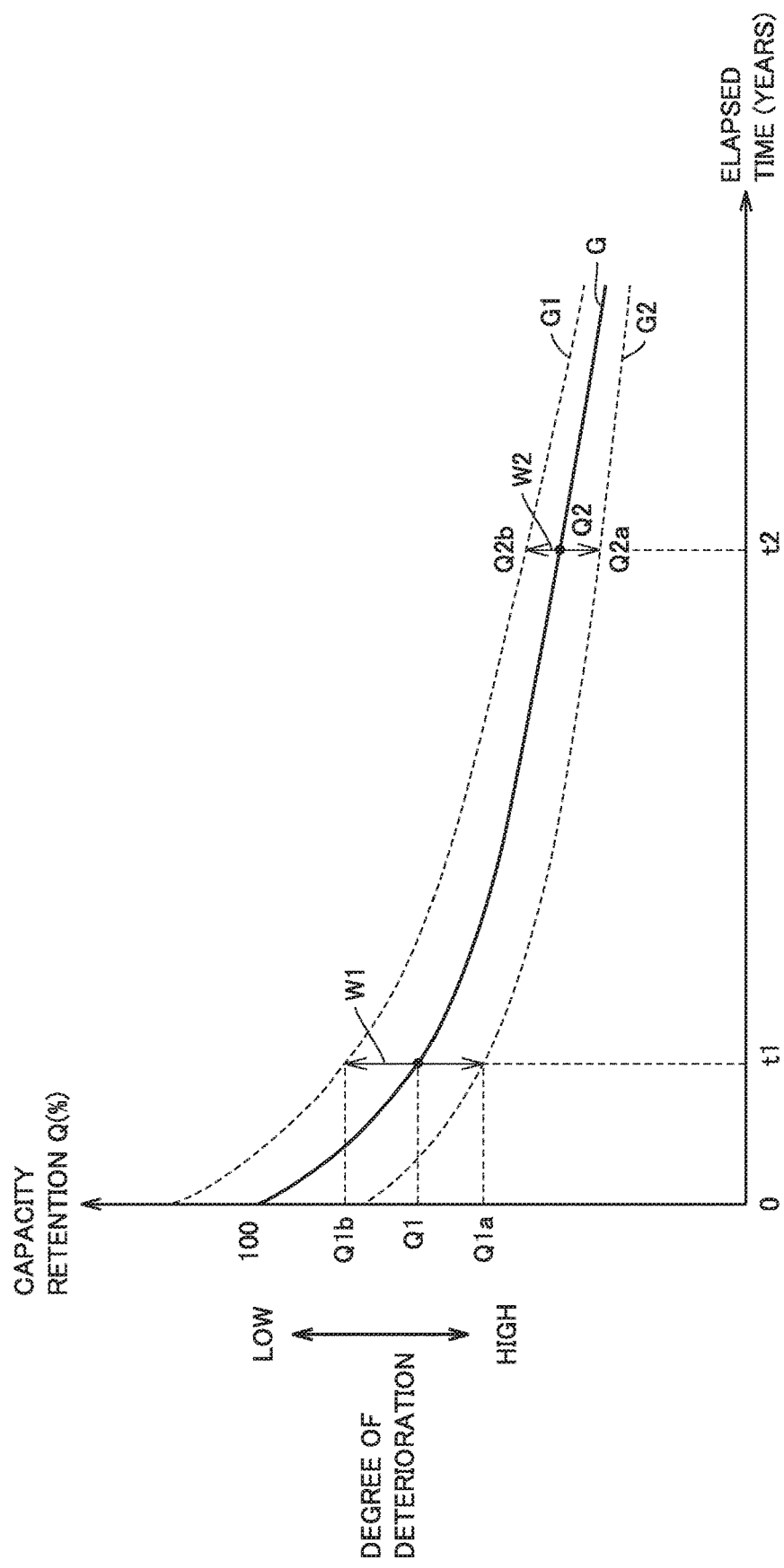
FIG. 2 is a diagram showing one example of a deterioration curve representing deterioration over time of a main battery.

FIG. 2 is a diagram showing one example of a deterioration curve representing deterioration over time of main battery 10. In FIG. 2, the abscissa represents elapsed time (years) since manufacturing of main battery 10 and the ordinate represents capacity retention Q (%) of main battery 10. A deterioration curve of main battery 10 is shown with a solid line G in FIG. 2.

Capacity retention Q of main battery 10 is defined, for example, as a percentage of a full charge capacity at a current time point with respect to a full charge capacity (Ah) at the time when main battery 10 was new (manufactured), and it represents one of parameters on which quantitative evaluation of a degree of deterioration of main battery 10 can be based. It is understood from the definition that a degree of deterioration of main battery 10 is lower as capacity retention Q is higher and the degree of deterioration of main battery 10 is higher as capacity retention Q is lower.

Referring to FIG. 2, in general, a secondary battery often has such deterioration characteristics that deterioration proceeds fast in an initial stage immediately after a time point of manufacturing (time 0) and a rate of progress of deterioration is thereafter stabilized. Main battery 10 also exhibits such a rate of progress of deterioration, and a slope of the deterioration curve immediately after manufacturing is great.

A method of calculating capacity retention Q will now be described. Controller 30 calculates capacity retention Q while main battery 10 is externally charged by external power supply 40.

A method of calculating a capacity retention Q1 at an elapsed time t1 will be described by way of example. For example, controller 30 starts external charging at elapsed time t1. When an SOC of main battery 10 has attained to a prescribed SOC (SOC1: for example, 20%), controller 30 obtains measurement data of main battery 10 from monitoring ECU 18 and starts current integration and time counting. Then, when the SOC of main battery 10 has attained to full charge (SOC2: for example, 100%), controller 30 stops current integration and time counting. Controller 30 calculates an amount of power $\Delta Ah$ by which main battery 10 was charged during a period when the SOC of main battery 10 was varied from SOC1 to SOC2. Specifically, controller 30 calculates amount of power $\Delta Ah$ by integrating battery current Ib obtained from monitoring ECU 18.

Controller 30 calculates a full charge capacity C1 of main battery 10 at elapsed time t1 in accordance with an expression (1) shown below, based on SOC1, SOC2 and amount of power $\Delta Ah$ of main battery 10.

$$C1 = \Delta Ah / (SOC1 - SOC2) \times 100 \qquad (1)$$

Capacity retention Q1 of main battery 10 at elapsed time t1 is calculated by dividing full charge capacity C1 calculated in accordance with the expression (1) by an initial value C0 of the full charge capacity of main battery 10 (for example, a full charge capacity at the time when main battery 10 was manufactured). Specifically, capacity retention Q1 is calculated in accordance with an expression (2) shown below.

$$Q1 = C1/C0 \times 100 \qquad (2)$$

Though description is not repeated, a capacity retention Q2 at an elapsed time t2 can also be calculated similarly to capacity retention Q1.

Calculated capacity retention Q contains an error. Specifically, the capacity retention may contain a detection error in various sensors (current sensor 15, temperature sensor 16, and voltage sensor 17) used for obtaining measurement data of main battery 10 and/or a calculation error in calculation of a degree of deterioration (for example, calculation of an SOC). In particular, in a method of calculating capacity retention Q based on amount of power $\Delta Ah$ calculated by current integration as described above, a detection error in current sensor 15 is mainly accumulated and the detection error may affect calculation of capacity retention Q.

A dashed line G1 shown in FIG. 2 shows a graph of a deterioration curve of main battery 10 when an error attains to the positive maximum in calculation of capacity retention Q with the method above. A dashed line G2 shown in FIG. 2 shows a graph of a deterioration curve of main battery 10 when the error attains to the negative maximum in calculation of capacity retention Q with the method above. The positive side means a direction of higher capacity retention Q and the negative side means a direction of lower capacity retention Q.

Specifically, description will be given with attention being paid to elapsed time t1. Capacity retention Q1 at elapsed time t1 can take a value within a range from Q1a to Q1b in consideration of an error margin (Q1a<Q1<Q1b). In other words, capacity retention Q1 at elapsed time t1 may be varied within a range W1 (Q1a to Q1b). Similarly, capacity retention Q2 at elapsed time t2 may be varied within a range W2 (Q2a to Q2b).

As can be recognized in FIG. 2, an error margin is smaller as capacity retention Q is lower. In other words, range W2 is smaller than range W1 (W1>W2) for the following reason. When main battery 10 deteriorates and capacity retention Q (full charge capacity) lowers, a time period required for charging from a prescribed SOC (for example, 20%) to full charge (SOC=100%) is shorter than in the initial stage. Therefore, since the number of pieces of data of accumulated battery current Ib decreases, accumulated errors are smaller. Therefore, as deterioration of main battery 10 proceeds, the error margin is smaller.

In vehicle 100 incorporating main battery 10 with deterioration characteristics (deterioration curve) as described above, capacity retention Q is calculated and shown on display 35, for example, each time charging from a prescribed SOC to full charge is carried out (for example, external charging).

As described above, calculated capacity retention Q contains an error. When a capacity retention calculated at certain timing and a capacity retention calculated at next timing contain errors opposite to each other with respect to a true value, a shown value of the capacity retention may have considerably increased or decreased. Specifically, for example, a capacity retention calculated at certain timing (during external charging) may take an upper limit value within a possible range (a value on dashed line G1) and a capacity retention calculated in next external charging may take a lower limit value within the possible range (a value on dashed line G2). Alternatively, an example opposite to the above may occur. Specifically, a capacity retention calculated in one external charging may take a lower limit value within the possible range (a value on dashed line G2) and a capacity retention calculated in next external charging may take an upper limit value within the possible range (a value on dashed line G1). In such a case, capacity retention Q shown on display 35 may appear to have considerably increased or decreased. Then, a user of vehicle 100 may feel that deterioration of main battery 10 abruptly proceeded during a period from previous external charging until present external charging, or may feel that deterioration of main battery 10 has recovered. Thus, without proper representation, the user may feel strange about shown capacity retention Q. Since deterioration, that is, lowering in capacity retention, of main battery 10 leads to decrease in driving range of vehicle 100 (what is called an EV driving range), it is an important factor for the user.

In vehicle 100 according to the present embodiment, in showing capacity retention Q on display 35, capacity retention Q is shown together with an error margin. Specifically, capacity retention range WQ which includes an error margin together with capacity retention Q is shown on display 35. Capacity retention range WQ corresponds to one example of a "deterioration degree range" according to the present disclosure.

Figure 3:
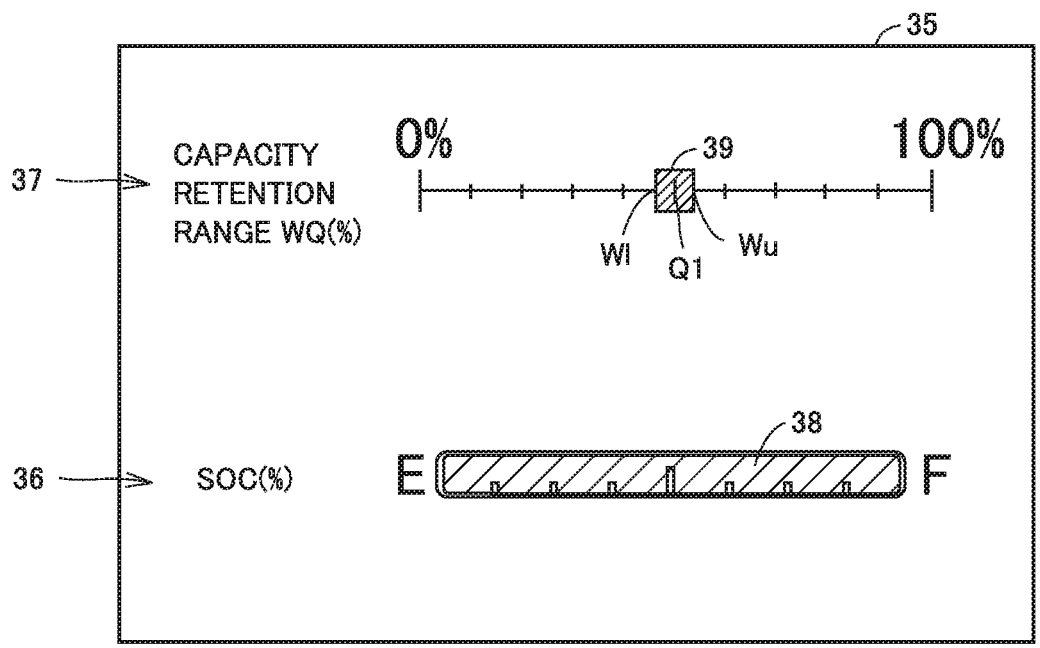
FIG. 3 is a diagram showing an exemplary screen shown on a display of the vehicle.

FIG. 3 is a diagram showing an exemplary screen shown on display 35 of vehicle 100. FIG. 3 shows capacity retention range WQ and an SOC at elapsed time t1 by way of example. Capacity retention range WQ includes an error margin together with capacity retention Q, and is shown as an extent. The error margin is shown as a width between dashed line G1 and dashed line G2 in FIG. 2. For example, an error margin can be calculated in advance based on specifications of various sensors (in particular, current sensor 15) included in vehicle 100 and/or accuracy in calculation of an SOC. Alternatively, an error margin may be set as appropriate in accordance with a time elapsed since manufacturing of main battery 10. Display 35 may be configured to show a current speed, a cumulative travel distance, and an outside air temperature of vehicle 100 in addition to capacity retention range WQ and an SOC.

Referring to FIG. 3, display 35 shows a current SOC of main battery 10 in an area 36. Specifically, a current SOC is shown as a bar 38 extends or contracts depending on a calculated value of the SOC. FIG. 3 shows SOC2 at elapsed time t1, that is, the SOC of 100%. For example, when the SOC decreases to 90%, bar 38 contracts to a position indicating 90% so as to show the SOC of 90%.

Display 35 shows current capacity retention range WQ of main battery 10 in an area 37. Specifically, capacity retention range WQ (%) is shown as a plot 39 over a range (an extent) between numeric values. Wu and Wl are calculated in accordance with expressions (3) and (4) below, where Wu represents a value on an upper limit side of the range of plot 39, Wl represents a value on a lower limit side thereof, x % represents an error margin on a positive side of the calculated capacity retention, and y % represents an error margin on a negative side thereof.

$$Wu = Qx(1+(x/100)) \qquad (3)$$

$$Wl = Qx(1+(y/100)) \qquad (4)$$

For example, it is assumed that capacity retention Q1 at elapsed time t1 is 50% and that an error margin is ±4%. Then, according to the expression (3), Wu is calculated as Wu=52, and according to the expression (4), Wl is calculated as Wl=48. Namely, plot 39 is shown to have a range from 48% to 52%. Plot 39 can linearly be varied over the range. The range (extent) between Wu to Wl corresponds to the "range" according to the present disclosure.

Thus, by showing capacity retention range WQ including an error margin of calculated capacity retention Q together with current capacity retention Q of main battery 10, a user of vehicle 100 can recognize that capacity retention Q shown on display 35 has a certain extent. Thus, even though a capacity retention calculated at certain timing and a capacity retention calculated at next timing contain errors opposite to each other with respect to a true value, variation in capacity retention is within user's expectations and hence the user is less likely to feel strange. Therefore, strange feeling felt by the user can be lessened.

As deterioration of main battery 10 proceeds, the capacity retention lowers and hence influence by an error in capacity retention is greater. In calculation of a capacity retention with the approach described above, when a full charge capacity lowers due to deterioration of main battery 10 in charging from a prescribed SOC until full charge, a time period required for charging of main battery 10 is accordingly shorter. Then, the number of pieces of data to be used for calculation of the capacity retention (full charge capacity) decreases and accumulated errors also decrease. Therefore, as deterioration of main battery 10 proceeds, an error margin is smaller. Therefore, as deterioration of main battery 10 proceeds, the error margin is smaller and influence by the error in the capacity retention can be lessened.

<Processing Performed by Controller 30>

Figure 4:
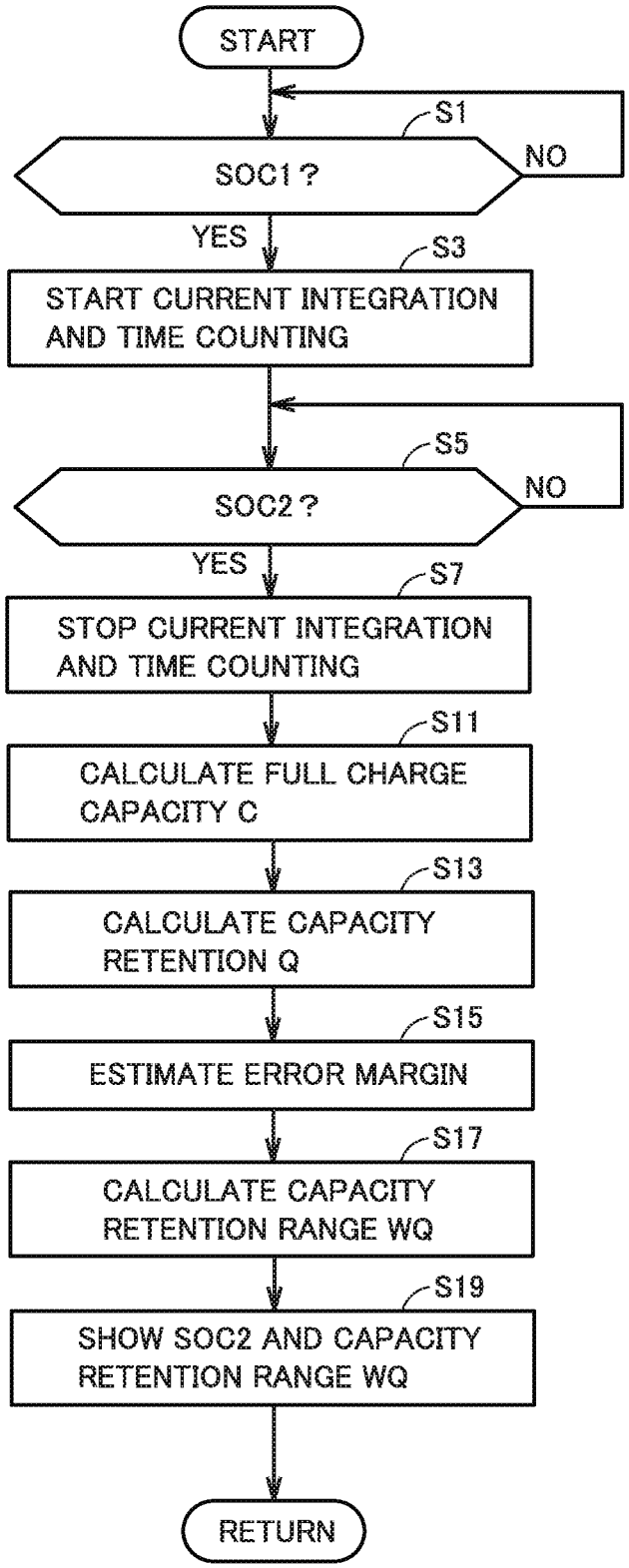
FIG. 4 is a flowchart showing one example of processing performed by a controller according to the embodiment.

FIG. 4 is a flowchart showing one example of processing performed by controller 30 according to the embodiment. Each step shown in the flowchart is repeatedly performed by controller 30 each time main battery 10 is externally charged. Though an example in which each step in the flowchart shown in FIG. 4 and FIG. 6 which will be described later is performed by software processing by controller 30 is described, at least one or all of steps may be performed by hardware (an electric circuit) fabricated in controller 30.

When external charging of main battery 10 is started, controller 30 starts execution of the flowchart and determines whether or not an SOC of main battery 10 has attained to SOC1 (for example, 20%) (step S1, the step being abbreviated as "S" below). Controller 30 stands by until the SOC of main battery 10 attain to SOC1 (NO in S1), and when the SOC of main battery 10 has attained to SOC1 (YES in S1), the controller obtains measurement data of main battery 10 from monitoring ECU 18 and starts current integration and time counting (S3). For example, a not-shown timer contained in controller 30 performs time counting.

An SOC can be calculated, for example, by a method using an open circuit voltage (OCV)-SOC curve (a map) showing relation between an SOC and an OCV. For example, by storing an OCV-SOC curve found in advance as a first map in storage 32 of controller 30, an SOC can be calculated by referring to the first map for a value detected by voltage sensor 17. A method of calculating an SOC is not limited to the above, and, for example, the current integration method may be employed.

Controller 30 determines whether or not the SOC of main battery 10 has attained to SOC2 (full charge) (S5). When the SOC of main battery 10 has attained to SOC2 (YES in S5), controller 30 stops current integration and time counting (S7).

Controller 30 calculates full charge capacity C (S11). Specifically, controller 30 calculates amount of power ΔAh based on values of the current integrated in steps S3 to S7. Then, controller 30 calculates full charge capacity C in accordance with the expression (1) described above based on SOC1, SOC2, and amount of power ΔAh.

Then, controller 30 calculates capacity retention Q (S13). Specifically, controller 30 calculates capacity retention Q in accordance with the expression (2) based on full charge capacity C calculated in S11 and the initial value of the full charge capacity of main battery 10. The initial value of the full charge capacity of main battery 10 may be determined, for example, at the time of manufacturing or shipment of main battery 10 and stored in storage 32 of controller 30 in advance.

Controller 30 estimates an error margin from an obtained counted time T (S15). The error margin can be found in advance, for example, based on the number of pieces of data of battery current Ib integrated every prescribed time, specifications of various sensors, and accuracy in calculation of the SOC, and stored in storage 32 of controller 30. In the present embodiment, a detection error in current sensor 15 greatly affects the error margin. Relation between counted time T (the number of pieces of integrated data of the current) and the error margin may be found in advance and stored as a second map in storage 32 of controller 30. Then, controller 30 can estimate an error margin by referring to the second map for counted time T.

Controller 30 calculates as capacity retention range WQ, a value including the error margin estimated in S15 together with capacity retention Q calculated in S13 based on the expressions (3) and (4) (S17).

Controller 30 has display 35 show SOC2 and capacity retention range WQ calculated in S17 (S19).

As set forth above, display 35 of vehicle 100 according to the present embodiment shows current capacity retention range WQ of main battery 10 including an error margin. By showing capacity retention range WQ including an error margin of calculated capacity retention Q together with current capacity retention Q of main battery 10, a user of vehicle 100 can recognize that capacity retention Q shown on display 35 has a certain extent. Thus, even though a capacity retention calculated at certain timing and a capacity retention calculated at next timing contain errors opposite to each other with respect to a true value, such variation in capacity retention is within user's expectations and hence the user is less likely to feel strange about the variation. Therefore, strange feeling felt by the user can be lessened.

First Modification

Figure 5:
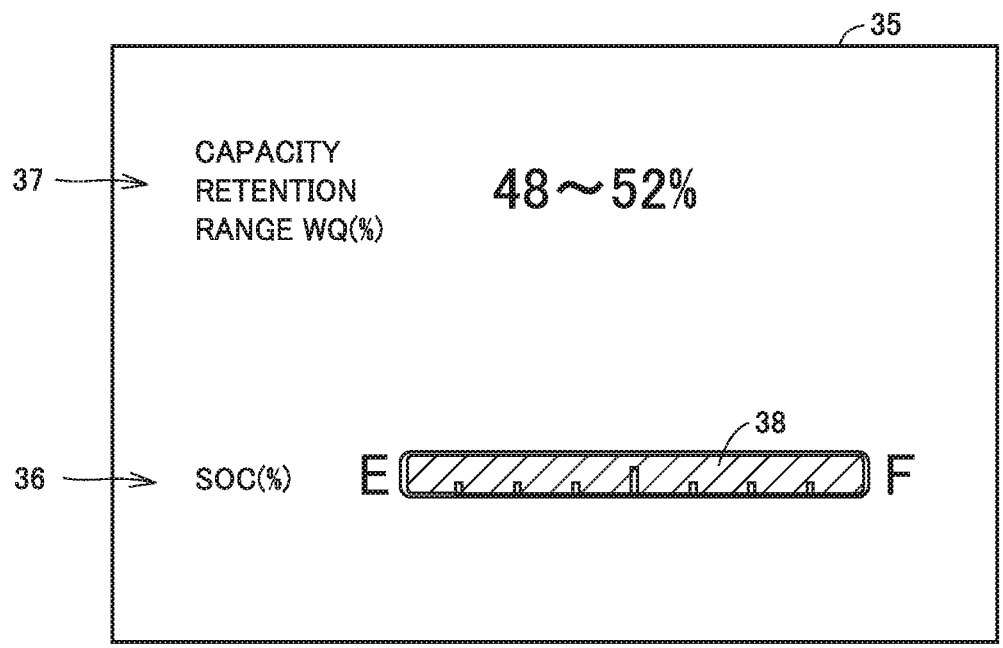
FIG. 5 is a diagram showing another exemplary screen shown on the display of the vehicle.

FIG. 5 is a diagram showing another exemplary screen shown on display 35 of vehicle 100. An example in which capacity retention range WQ of main battery 10 is shown as a plot over a range (extent) between numeric values is described in the embodiment. A manner of representation, however, is not limited as above, and capacity retention range WQ of main battery 10 may be shown, for example, by a numeric value (percent) as shown in FIG. 5.

Instead of or in addition to representation of capacity retention range WQ of main battery 10 on display 35, for example, auditory notification or indication based on the number of turned-on lights may be provided.

Second Modification

An example in which capacity retention Q is calculated each time of external charging is described in the embodiment. Capacity retention Q, however, may be calculated every prescribed cycle including a period during which vehicle 100 is running. In this case, though an error margin of capacity retention Q does not decrease with lowering in capacity retention Q as in the embodiment, strange feeling felt by a user can be lessened by showing capacity retention range WQ.

Figure 6:
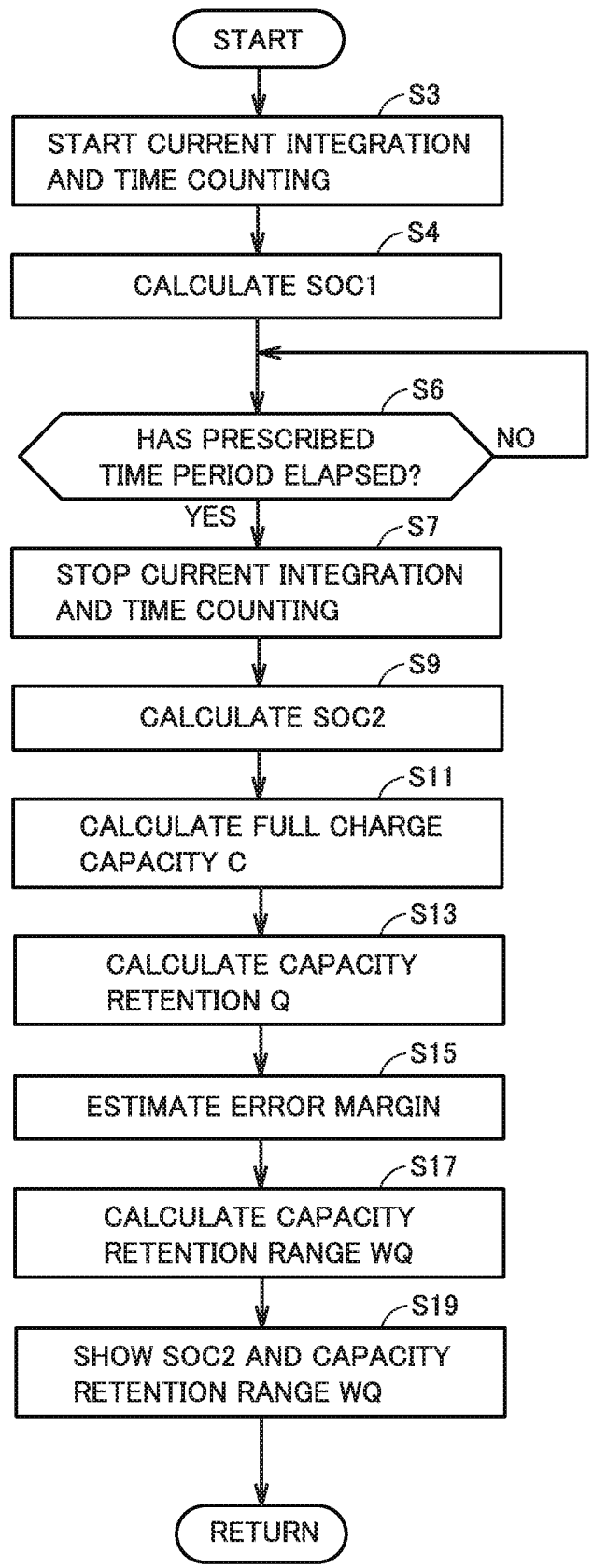
FIG. 6 is a flowchart showing one example of processing performed by the controller according to a second modification.

FIG. 6 is a flowchart showing one example of processing performed by controller 30 according to a second modification. The flowchart in FIG. 6 is different from the flowchart in FIG. 4 in that S1 and S5 are not performed but S4, S6, and S9 are added. Description of the steps given with reference to FIG. 4 will not be repeated. Each step in the flowchart shown in FIG. 6 is repeatedly performed by controller 30 every prescribed cycle.

When a prescribed cycle comes, controller 30 starts execution of the flowchart. The controller obtains measurement data of main battery 10 from monitoring ECU 18 and starts current integration and time counting (S3).

Controller 30 calculates an SOC of main battery 10 and has the calculated SOC stored as SOC1 (S4).

Controller 30 determines whether or not a prescribed time period has elapsed since start of time counting (S6). When the prescribed time period has not elapsed since start of time counting (NO in S6), controller 30 continues current integration and time counting.

When the prescribed time period has elapsed since start of time counting (YES in S6), controller 30 stops current integration and time counting (S7).

Controller 30 calculates the SOC of main battery 10 and has the calculated SOC stored as SOC2 (S9).

Controller 30 calculates full charge capacity C (S11). Specifically, controller 30 calculates amount of power ΔAh based on values of the current integrated in S3 to S7 and counted time. Controller 30 then performs S11 to S19 as described with reference to the flowchart in FIG. 4.

Thus, display 35 of vehicle 100 according to the second modification shows current capacity retention range WQ of main battery 10 including an error margin. A user of vehicle 100 can thus recognize that capacity retention Q shown on display 35 has a certain extent. Thus, even though the capacity retention shown on display 35 is varied, the variation is within user's expectations and the user is less likely to feel strange about the variation. Therefore, strange feeling felt by the user can be lessened.

Third Modification

The embodiment describes a capacity retention (an electric current capacity retention) as representing a degree of deterioration with a unit "Ah" of the full charge capacity of main battery 10. A capacity retention (a power capacity retention), however, may represent a degree of deterioration, for example, with a unit "Wh" of the full charge capacity of main battery 10.

Fourth Modification

The embodiment describes capacity retention Q of main battery 10 as representing a degree of deterioration. For example, as full charge capacity C lowers due to deterioration of main battery 10, an upper limit value of an EV driving range at the time when main battery 10 is in the fully charged state also decreases. Therefore, the upper limit value of the EV driving range at the time when main battery 10 is in the fully charged state may represent the degree of deterioration. The EV driving range can be calculated, for example, by multiplying average power efficiency (km/kWh) of vehicle 100 by a current full charge capacity (kWh).

Fifth Modification

Though a degree of deterioration of main battery 10 containing an error is shown on display 35 of vehicle 100 in the embodiment, such representation may be given in a system outside vehicle 100.

Figure 7:
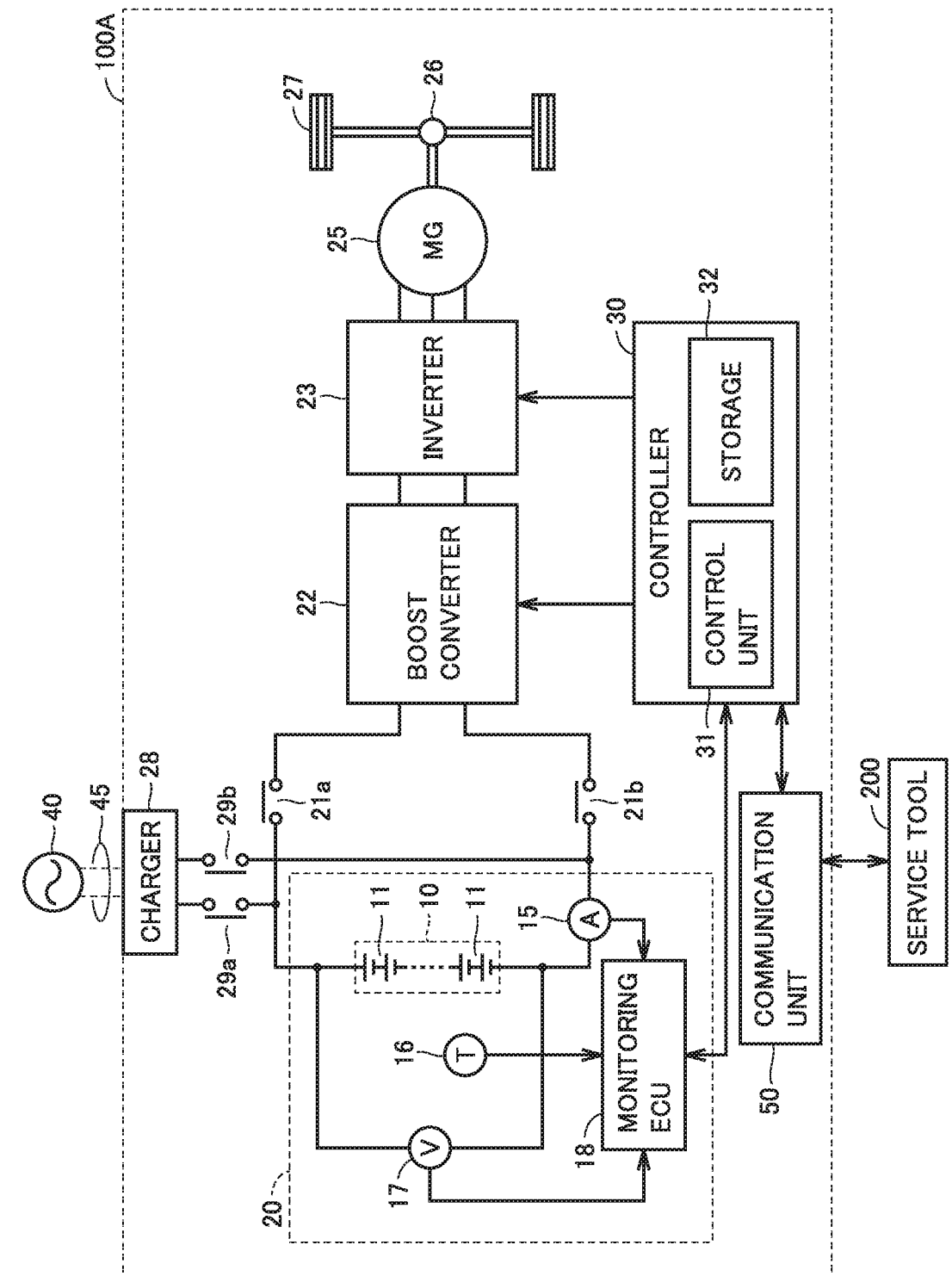
FIG. 7 is a block diagram showing an exemplary configuration in which a degree of deterioration of the main battery is shown outside the vehicle.

FIG. 7 is a block diagram showing an exemplary configuration in which a degree of deterioration of main battery 10 is shown outside the vehicle. Referring to FIG. 7, in this modification, a vehicle 100A does not include display 35 but further includes a communication unit 50 in the configuration of vehicle 100 shown in FIG. 1.

Communication unit 50 has a function to establish communication with a service tool 200 provided outside vehicle 100A. Communication with service tool 200 may be wired or wireless. Communication unit 50 can be implemented, for example, by a vehicle-mounted communication module.

Service tool 200 is provided, for example, in a dealer, and calculates a degree of deterioration of main battery 10 based on measurement data of main battery 10 obtained from vehicle 100A. In vehicle 100A, measurement data of main battery 10 is collected and stored in storage 32. When communication is established between service tool 200 and communication unit 50, the measurement data stored in storage 32 is transmitted to service tool 200 through communication unit 50.

Service tool 200 then calculates a current degree of deterioration of main battery 10 based on the measurement data obtained from vehicle 100A. A degree of deterioration is represented, for example, by current capacity retention Q of main battery 10 as in the embodiment above. The capacity retention of main battery 10 can be calculated in accordance with the expressions (1) and (2).

Service tool 200 estimates an error margin from counted time T and the second map obtained from vehicle 100A. The error margin can be calculated in accordance with the expressions (3) and (4).

Capacity retention range WQ can be calculated based on capacity retention Q and the error margin. Service tool 200 has a display of service tool 200 show calculated capacity retention range WQ.

Though a degree of deterioration and an error margin of main battery 10 are calculated by controller 30 of vehicle 100 in the embodiment, a server outside the vehicle may calculate the degree of deterioration and the error margin.

Figure 8:
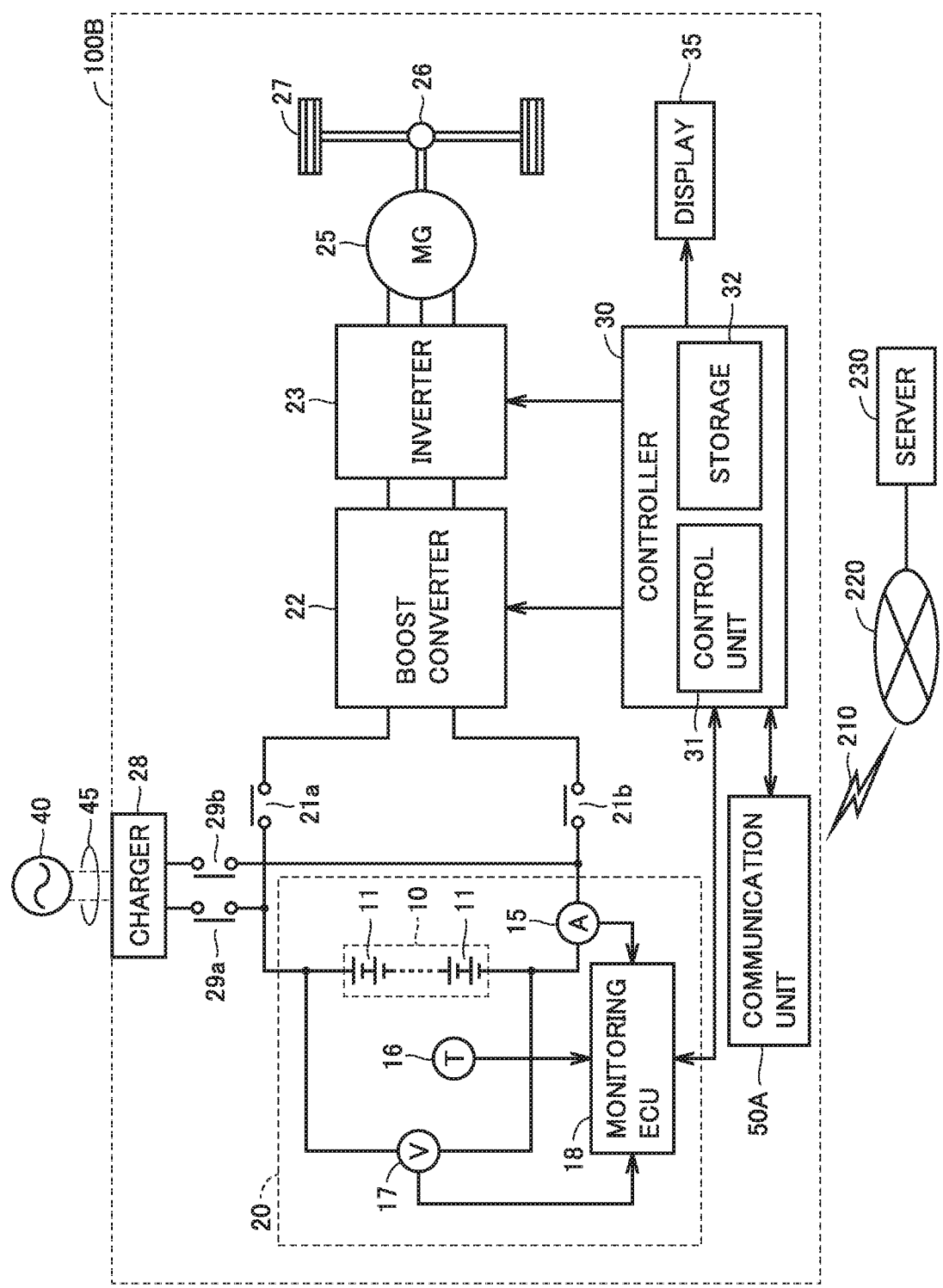
FIG. 8 is a block diagram showing an exemplary configuration in which a degree of deterioration of the main battery is calculated outside the vehicle.

FIG. 8 is a block diagram showing an exemplary configuration in which a degree of deterioration of main battery 10 is calculated outside the vehicle. Referring to FIG. 8, in this modification, a vehicle 100B further includes a communication unit 50A in the configuration of vehicle 100 shown in FIG. 1.

Communication unit 50A has a function to form a path 210 for communication with a server 230 provided outside vehicle 100B to establish wireless communication. For example, communication unit 50A can be implemented by a vehicle-mounted wireless communication module.

Vehicle 100B can bidirectionally communicate data with server 230 by being connected to a wide area communication network 220 (representatively the Internet) through communication path 210 formed by communication unit 50A. Measurement data of main battery 10 is transmitted from vehicle 100B to server 230 every prescribed cycle. Counted time T and the second map are transmitted from vehicle 100B to server 230 every prescribed cycle.

When server 230 obtains measurement data of main battery 10 from vehicle 100B, it calculates a degree of deterioration of main battery 10 based on the obtained measurement data. The degree of deterioration is represented, for example, by current capacity retention Q of main battery 10 as in the embodiment above. Capacity retention Q of main battery 10 can be calculated in accordance with the expressions (1) and (2).

Server 230 calculates an error margin based on counted time T and the second map obtained from vehicle 100B. The error margin can be calculated in accordance with the expressions (3) and (4). Capacity retention range WQ can then be calculated based on capacity retention Q and the error margin. Server 230 transmits calculated capacity retention range WQ to vehicle 100B.

Vehicle 100B has display 35 show capacity retention range WQ received from server 230. Representation on display 35 is the same as in the embodiment.

The entirety or a part of the embodiment and the first to fifth modifications may be carried out as being combined.

Though a display apparatus is applied to a vehicle in the embodiment and the first to fifth modifications, the display apparatus according to the present disclosure is not limited to an application to a vehicle but is applicable also to other equipment which shows a degree of deterioration of a secondary battery.

Though an embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. A display apparatus which shows a degree of deterioration of a secondary battery, the display apparatus comprising:
   a controller configured to calculate the degree of deterioration of the secondary battery; and
   a display configured to show the degree of deterioration, the controller being configured to control the display to show a deterioration degree range having a margin of the calculated degree of deterioration.

2. The display apparatus according to claim 1, wherein the controller is configured to
   calculate an SOC difference when the secondary battery is charged from a prescribed SOC to full charge and an amount of electric power used for charging the secondary battery from the prescribed SOC to full charge, and
   calculate the degree of deterioration based on the SOC difference and the amount of electric power.

3. A vehicle comprising the display apparatus according to claim 1.

* * * * *